United States Patent
Webb et al.

(10) Patent No.: US 9,967,821 B2
(45) Date of Patent: May 8, 2018

(54) MOBILE COMMUNICATIONS SYSTEM, NETWORK ELEMENT AND METHOD

(71) Applicant: SONY CORPORATION, Tokyo (JP)

(72) Inventors: Matthew Webb, London (GB); Yuichi Morioka, Reading (GB)

(73) Assignee: SONY CORPORATION, Tokyo (JP)

( * ) Notice: Subject to any disclaimer, the term of this patent is extended or adjusted under 35 U.S.C. 154(b) by 322 days.

(21) Appl. No.: 14/413,757

(22) PCT Filed: Aug. 29, 2013

(86) PCT No.: PCT/GB2013/052269
§ 371 (c)(1),
(2) Date: Jan. 9, 2015

(87) PCT Pub. No.: WO2014/037703
PCT Pub. Date: Mar. 13, 2014

(65) Prior Publication Data
US 2015/0195787 A1 Jul. 9, 2015

(30) Foreign Application Priority Data

Sep. 7, 2012 (GB) .................................. 1216035.4

(51) Int. Cl.
*H04W 52/02* (2009.01)
*H04W 72/04* (2009.01)

(52) U.S. Cl.
CPC ... *H04W 52/0235* (2013.01); *H04W 72/0453* (2013.01); *H04W 52/0222* (2013.01); *Y02B 60/50* (2013.01)

(58) Field of Classification Search
None
See application file for complete search history.

(56) References Cited

U.S. PATENT DOCUMENTS

2008/0014969 A1* 1/2008 Laroia .................. H04W 68/00
455/458
2009/0040955 A1* 2/2009 Jung ................. H04W 52/0216
370/311

(Continued)

FOREIGN PATENT DOCUMENTS

CN          101662345 A     3/2010
EP          2 330 785 A1    6/2011

(Continued)

OTHER PUBLICATIONS

U.S. Appl. No. 14/415,023, filed Jan. 15, 2015, Webb, et al.

(Continued)

*Primary Examiner* — Andrew Lai
*Assistant Examiner* — Jamaal Henson
(74) *Attorney, Agent, or Firm* — Oblon, McClelland, Maier & Neustadt, L.L.P.

(57) ABSTRACT

A mobile communications system transmitting data to and/or receiving data from communications devices includes one or more base stations, each including a transmitter and a receiver configured to provide a wireless access interface for communicating data to/from the communications devices. The wireless access interface provides plural communications resource elements across a first frequency range and within a second frequency range within and smaller than the first frequency range. The wireless access interface includes plural time divided sub-frames, at least one of the sub-frames including a first wideband control channel in a part of each sub-frame for communicating first signalling information to one or more of the communications devices, and a second narrow band control channel in a second part of each sub-frame. The base stations are configured to transmit a sleep indication signal to one or more of the communication devices, to realize a power saving.

24 Claims, 9 Drawing Sheets

(56) References Cited

U.S. PATENT DOCUMENTS

| | | | | |
|---|---|---|---|---|
| 2009/0180414 | A1* | 7/2009 | Maeda | H04B 7/2643 370/311 |
| 2011/0235547 | A1 | 9/2011 | Fang et al. | |
| 2011/0292854 | A1* | 12/2011 | Terry | H04L 5/001 370/311 |
| 2013/0083753 | A1* | 4/2013 | Lee | H04W 72/0453 370/329 |
| 2013/0194995 | A1* | 8/2013 | Reinhardt | H04W 52/0219 370/311 |
| 2014/0018087 | A1* | 1/2014 | McNamara | H04L 5/0039 455/450 |
| 2014/0112285 | A1* | 4/2014 | Darwood | H04W 72/042 370/329 |

FOREIGN PATENT DOCUMENTS

| | | |
|---|---|---|
| WO | WO 2012/048717 A1 | 4/2012 |
| WO | WO 2012/104634 A1 | 8/2012 |
| WO | WO 2012/104635 A1 | 8/2012 |
| WO | WO 2012/104644 A1 | 8/2012 |
| WO | WO 2012/172323 A1 | 12/2012 |

OTHER PUBLICATIONS

U.S. Appl. No. 14/414,743, filed Jan. 14, 2015, Morioka.
U.S. Appl. No. 14/414,169, filed Jan. 12, 2015, Morioka.
Search Report dated Dec. 18, 2012 in United Kingdom Patent Application No. GB1216035.4.
International Search Report dated Dec. 4, 2013 in PCT/GB2013/052269 filed on Aug. 29, 2013.
3GPP TSG RAN WG1 Meeting #68 Dresden, Germany, "Maximum bandwidth reduction for low-cost MTC UE based on LTE", NEC Group, 7.7.1, Discussion/Decision, vol. RAN WG1, XP050562813, Feb. 6-10, 2012, R1-120259, 6 pages.
Office Action dated Aug. 15, 2017 in Japanese Patent Application No. 2015-530491 (with Partial English-language Translation).
ETRI, "Discussions on enhanced PDCCH in Rel-11", 3GPP TSG RAN WG1 Meeting #66bis, R1-113067, Oct. 4, 2011.
Combined Office Action and Search Report dated Nov. 16, 2017 in Chinese Patent Application No. 201380046897.5, citing document AO therein, 15 pages (with English-language Translation).

* cited by examiner

VC with control region structure similar to LTE Rel-8/9/10 design.

VC with control region structure similar to LTE Rel-11 EPDCCH design.

(a) HC, VC, VC control region and sleep indication signalling.

(b) Two of the 6 RBs comprising the VC, showing VC PDSCH and control (a) HC and VC structure, with the first 2 RBs of the VC expanded in (b) showing one resource allocation for the sleep indication signalling.

Distributed VC control region and distributed SIS region.

An extended SIS region containing SISI(s) and, e.g., a VC control region format indicator Extended SIS region in resources not used by shared HC and VC control region.

MOBILE COMMUNICATIONS SYSTEM, NETWORK ELEMENT AND METHOD

CROSS-REFERENCE TO RELATED APPLICATIONS

The present application claims priority to British Patent Application 1216035.4, filed in the UK IPO 7 Sep. 2012, the entire contents of which being incorporated herein by reference.

TECHNICAL FIELD OF THE DISCLOSURE

The present disclosure relates to mobile communications systems, network elements such as base stations for use in mobile communications systems, methods of communicating using mobile communications networks and communications devices.

BACKGROUND OF THE DISCLOSURE

Mobile communications systems continue to be developed to provide wireless communications services to a greater variety of electronic devices. In more recent years, third and fourth generation mobile telecommunication systems, such as those based on the 3GPP defined UMTS and Long Term Evolution (LTE) architectures have been developed to support more sophisticated communications services to personal computing and communications devices than simple voice and messaging services offered by previous generations of mobile telecommunication systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

More recently it has been recognised that rather than providing high data rate communications services to certain types of electronics devices, it is also desirable to provide communications services to electronics devices that are simpler and less sophisticated. For example, so-called machine type communication (MTC) applications may be semi-autonomous or autonomous wireless communication devices which may communicate small amounts of data on a relatively infrequent basis. Some examples include so-called smart meters which, for example, are located in a customer's house and periodically transmit information back to a central MTC server data relating to the customer's consumption of a utility such as gas, water, electricity and so on.

Whilst it can be convenient for a communications device such as an MTC type device to take advantage of the wide coverage area provided by a third or fourth generation mobile telecommunication network there are at present disadvantages. Unlike a conventional third or fourth generation communications device such as a smartphone, an MTC-type device is preferably relatively simple and inexpensive. The type of functions performed by the MTC-type device (e.g. collecting and reporting back data) do not require particularly complex processing to perform.

As will be appreciated, there may be a desire for many types of communications devices to conserve power. However this may be particularly applicable to MTC type devices, which are arranged to operate with a less sophisticated transceiver and may for example be low power and battery operated and for example may be deployed for a significant time before the batteries are to be replaced. Accordingly there is a desire to provide arrangements in which a power of all types of communications devices operating with a mobile communications networks can be conserved.

SUMMARY OF THE DISCLOSURE

According to a first aspect of the present disclosure there is provided a mobile communications system for transmitting data to and/or receiving data from communications devices. The mobile communications system includes one or more base stations, each of which includes a transmitter and a receiver, which are configured to provide a wireless access interface for communicating data to and/or from the communications devices. The wireless access interface provides a plurality of communications resource elements across a first frequency range. The wireless access interface includes a plurality of time divided sub-frames, which may for example include some or all of the plurality of communications resource elements of the first frequency range. At least one of the sub-frames includes a first wideband control channel in a part of the sub-frame for communicating first signalling information to one or more of the communications devices, and at least one of the sub-frames includes a second narrow band control channel in a second part of the sub-frame and having a bandwidth which is less than the first wideband control channel and a duration of the second narrow band control channel within the sub-frame is greater than a duration of the first wideband control channel within the sub-frame. The second narrow band control channel is configured for communicating second signalling information to one or more of the communications devices. The base stations are configured to transmit a sleep indication signal to one or more of the communications devices, the sleep indication signal indicating to the one or more of the communications devices that the communications devices do not need to receive the second signalling information from the second narrow band control channel. Accordingly a power saving to the communications devices which are not to receive the second signalling information for one or more sub-frames can be provided.

It is currently being proposed to provide mobile communications systems, such as LTE for example, in which a plurality of sub-carriers are divided in time to provide sub-frames. Each sub-frame may include a wide band control channel region for transmitting a control channel for communicating signalling information such as for example granting access to shared communications resources. Each sub-frame may also include at least one narrow band control channel region which has a narrower bandwidth than the wide band control channel region but has a longer time duration and can be used to transmit a further control channel to communicate the same information or different information for the same purpose as the control channel information communicated on the wide band control channel. The narrow band control channel region may for example have a duration which extends over substantially all of the remainder of a sub-frame after the wide band control channel region.

Embodiments of the present disclosure can provide an arrangement in which a mobile communications network is configured to provide a wireless access interface which includes a first wide band control channel and a second narrow band control channel Signalling information such as resource allocation messages for accessing shared resources of the wireless access interface may be communicated via either the first wide band communications channel or the second narrow band communications channel, or both. If there is a class of devices which is only able to receive resource allocation messages via the second narrow band communications channel then because this narrow band control channel needs to convey similar information to the wide band communications channel then it may be arranged to have a longer duration in time. However, if the narrow band communications channel is arranged to communicate signalling information to particular communications devices, such as for example, resource allocation messages, then a communications device must be arranged to receive the signals transmitted throughout the narrow band control channel, only then to determine that the signalling information is not for that communications device. For example resource allocation message are directed to a communications device to which the communications resources of the shared channels are being allocated. If a communications device is required to receive the signalling information from the narrow band control channel only then to discover that the resources are not allocated to that communications device then the communications device would have had to power at least some part of its receiver for a duration of the narrow band control channel. The narrow band control channel could stretch over a substantial part of the sub-frame, which is the case for example of LTE, in which an Enhanced Physical Downlink Control Channel (EPDCCH) may form such a narrow band control channel after a first wide band control channel, which in the example of LTE is a Physical Downlink Control Channel (PDCCH). The communications device must therefore maintain power to at least some part of its receiver in order to receive the signalling information from the narrow band communications channel. However if the communications device then discovers that the signalling information is not for the communications device then it will have wasted power.

Embodiments of the present disclosure have been devised in recognition that communications devices do not need to receive signalling information via a narrow band communications channel if the signalling information is not directed to the communications device. Accordingly, embodiments of the present disclosure provide an arrangement for transmitting a sleep indication signal to one or more communications devices which are not to receive signalling information in a narrow band communications channel for one or more sub-frames. In one example by transmitting the sleep indication signal early in a sub-frame, indicating that one or more of the communications devices do not need to receive the signalling information from the narrow band communications channel of the sub-frame, then these one or more communications devices can suspend or at least reduce the power to at least part of their receivers for at least some part of the sub-frame thereby saving power.

Alternatively the sleep indication signal could include an indication of one or more of the communications devices which are to receive signalling information in the second narrow band control channel, so that if a communications devices determines that its identifier is not present in the sleep indication signal then there is no signalling information in the second narrow band control channel and it can reduce power to at least part of its receiver.

As will be appreciated by those familiar with mobile communications systems such as LTE, data is communicated as packets via a wireless access interface, so that resources are not allocated to a communications device unless and until that communications device is to receive data on the downlink or transmit data on the uplink. Furthermore the communications device may be moved to an inactive, idle or sleep state in which it is currently inactive in that there are no communications services being required. However when in an active state the mobile may receive resource allocation messages once a communications session has been established with the network. Accordingly, when in an active state, packets may be communicated at non-regular intervals, because a scheduler in the base station or other network element may not have sufficient capacity to transmit or receive data from a communications device every sub-frame even when data is to be transmitted or received. As such in some examples, resource allocation messages are communicated in a control channel to allocate resources to the communications devices within a sub-frame on a sub-frame basis. Accordingly by communicating a sleep indication signal, the communications device may enter a sleep state for at least some part of the sub-frame, as distinct from a sleep state in which the communications device is inactive.

Various further aspects and embodiments of the disclosure are provided in the appended claims, including but not limited to, a mobile communications system network element for communicating data to and/or from mobile communications devices, used in a mobile communications network and a method of communicating data to and/or from mobile communications devices in a mobile communications system.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Conventional Network

Figure 1:
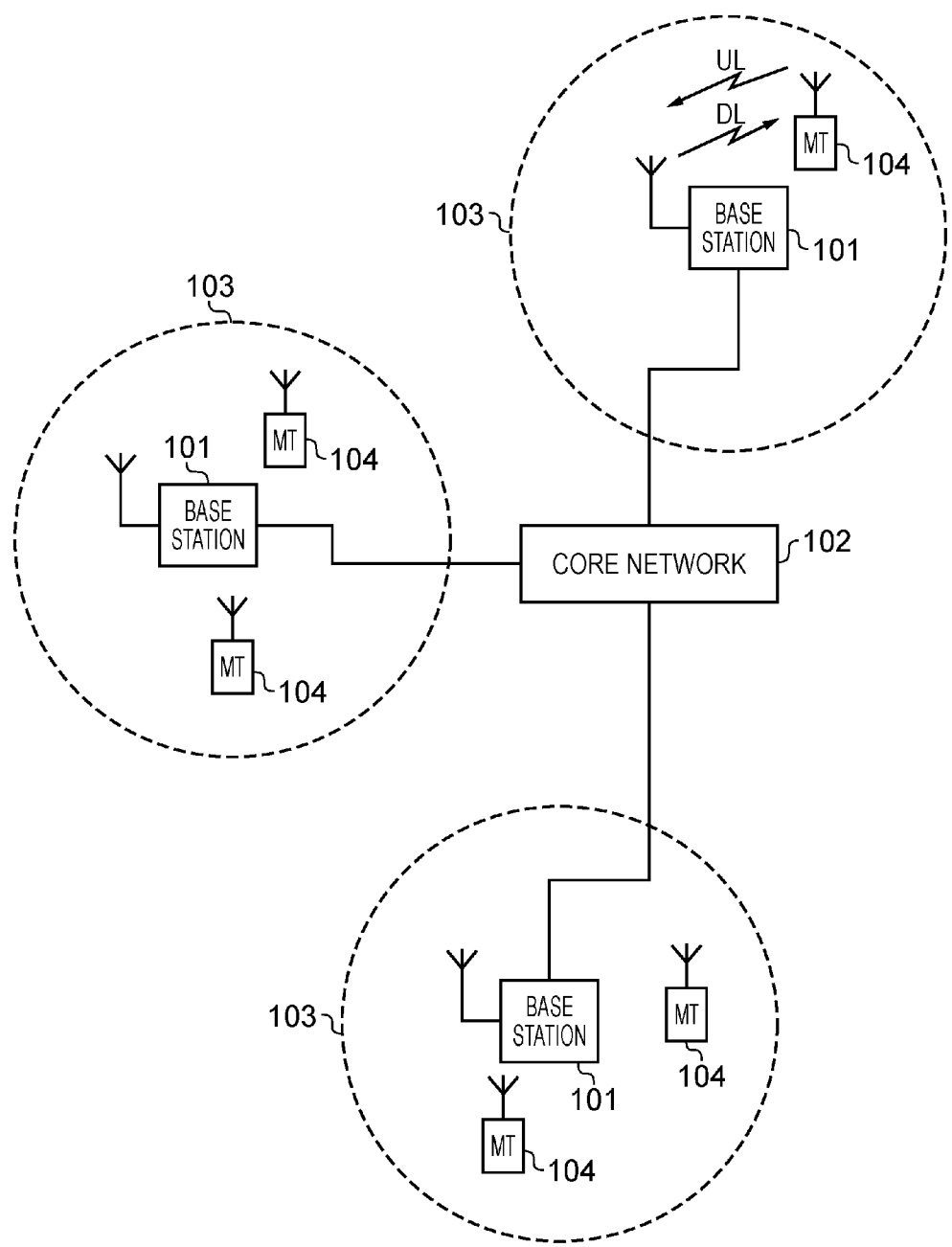
FIG. 1 provides a schematic diagram illustrating an example of a conventional mobile communications system.

FIG. 1 provides a schematic diagram illustrating the basic functionality of a conventional mobile communications system.

The network includes a plurality of base stations 101 connected to a core network 102. Each base station provides a coverage area 103 (i.e. a cell) within which data can be communicated to and from communications devices 104. Data is transmitted from a base station 101 to a communications device 104 within a coverage area 103 via a radio downlink. Data is transmitted from a communications device 104 to a base station 101 via a radio uplink. The core network 102 routes data to and from the base stations 104 and provides functions such as authentication, mobility management, charging and so on.

The term communications devices will be used to refer to a communications terminal or apparatus which can transmit or receive data via the mobile communications system. Other terms may also be used for communications devices such as communications terminal, remote terminal, transceiver device or user equipment (UE) which may or may not be mobile.

Figure 2:
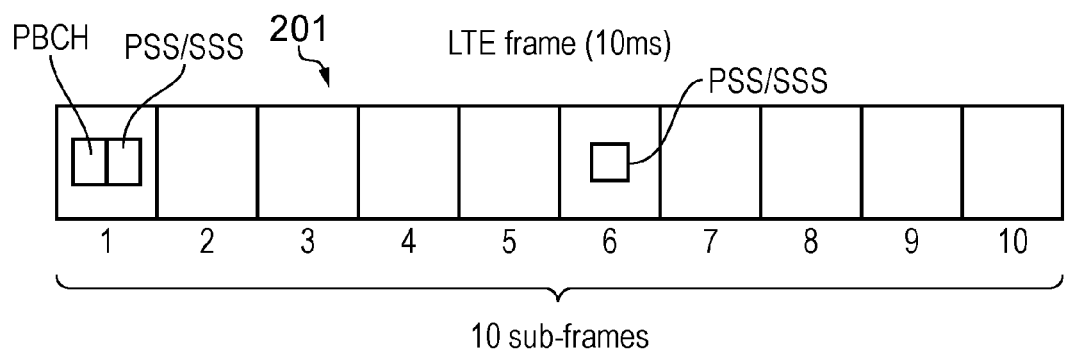
FIG. 2 provides a schematic diagram illustrating a conventional LTE downlink radio frame.

Mobile telecommunications systems such as those arranged in accordance with the 3GPP defined Long Term Evolution (LTE) architecture use an orthogonal frequency division multiplex (OFDM) based radio access interface for the radio downlink (so-called OFDMA) and the radio uplink (so-called SC-FDMA). Data is transmitted on the uplink and on the downlink on a plurality of orthogonal sub-carriers. FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame, in the case of frequency division duplex (FDD) system. A physical broadcast channel (PBCH) is transmitted in the first sub-frame of the LTE frame. The PSS, SSS and PBCH are discussed in more detail below.

Figure 3:
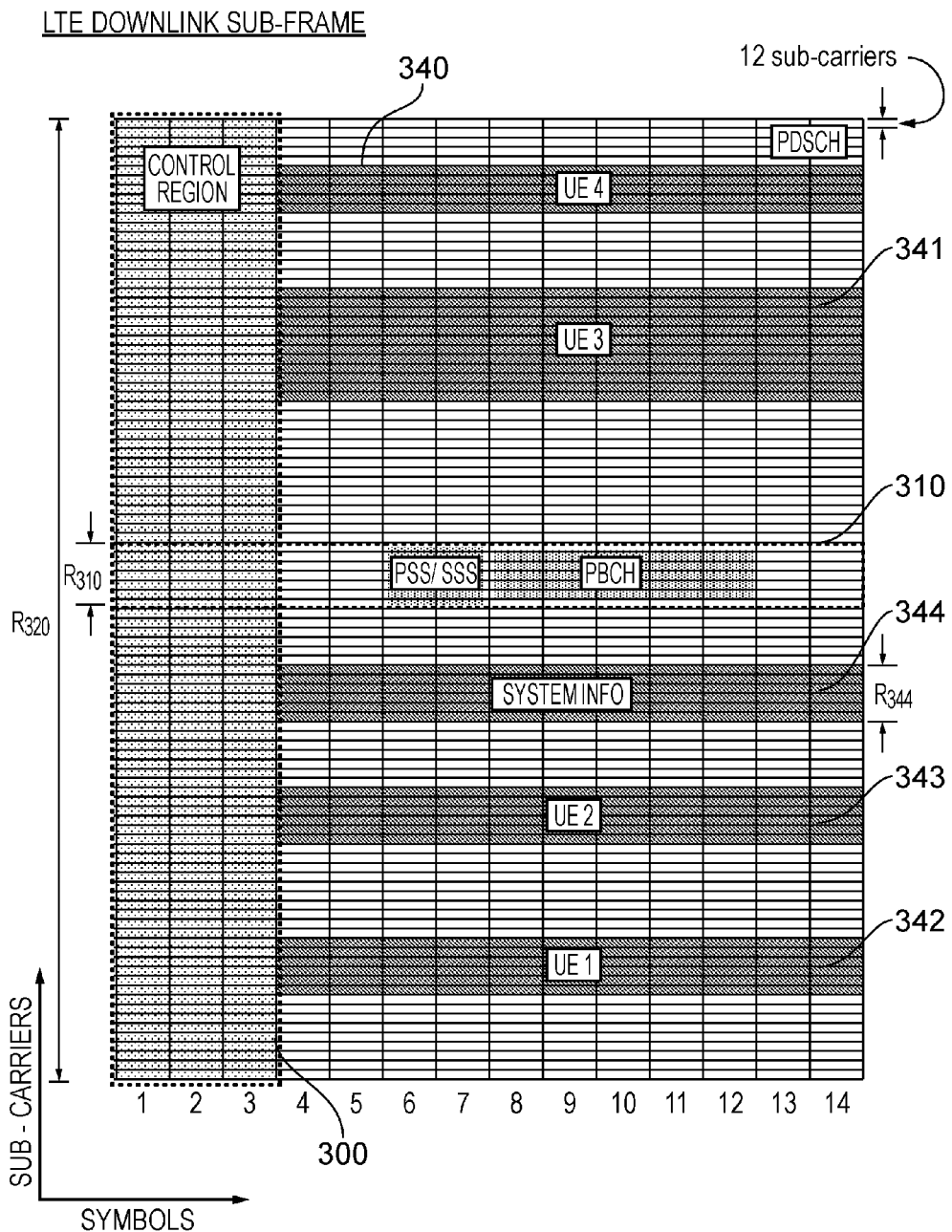
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, but instead each individual box in the sub-frame grid corresponds to twelve sub-carriers transmitted on one symbol.

FIG. 3 shows resource allocations for four LTE devices 340, 341, 342, 343. For example, the resource allocation 342 for a first LTE device (UE 1) extends over five blocks of twelve sub-carriers, the resource allocation 343 for a second LTE device (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific LTE devices. Thus, the PDCCH data transmitted in the control region 300 of the sub-frame shown in FIG. 3 would indicate that UE1 has been allocated the first block of resources 342, that UE2 has been allocated the second block of resources 343, and so on. In sub-frames where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow the LTE device 104 to achieve frame synchronisation and determine the cell identity of the enhanced Node B transmitting the downlink signal. The PBCH carries information about the cell, comprising a master information block (MIB) that includes parameters that the LTE devices require to access the cell. Data transmitted to individual LTE devices on the physical downlink shared channel (PDSCH) can be transmitted in the remaining blocks of communications resource elements of the sub-frame. Further explanation of these channels is provided in the following sections.

FIG. 3 also shows a region of PDSCH containing system information and extending over a bandwidth of $R_{344}$.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, data transmitted on the PDCCH, PCFICH and PHICH is typically distributed on the sub-carriers across the entire bandwidth of the sub-frame. Therefore a conventional LTE device must be able to receive the entire bandwidth of the sub-frame in order to receive and decode the control region.

Virtual Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE devices. Communications devices may include a high-performance LTE receiver unit capable of receiving and processing data from an LTE downlink frame across the full carrier bandwidth. However, such receiver units can be overly complex for a device which only needs to transmit or to receive small amounts of data. This may therefore limit the practicality of a widespread deployment of reduced capability MTC type devices in an LTE network. It is preferable instead to provide reduced capability devices such as MTC devices with a simpler receiver unit which is more proportionate with the amount of data likely to be transmitted to the device. Furthermore, as explained above it is desirable to include features in a mobile communications network and/or communications devices which can conserve power consumption of the communications devices.

In conventional mobile telecommunication networks, data is typically transmitted from the network to the communications devices in a frequency carrier (first frequency range) where at least part of the data spans substantially the whole of the bandwidth of the frequency carrier. Normally a communications device cannot operate within the network unless it can receive and decode data spanning the entire frequency carrier, i.e. a maximum system bandwidth defined by a given telecommunication standard, and therefore the use of communications devices with reduced bandwidth capability transceiver units is precluded.

However, as disclosed in co-pending International patent applications numbered PCT/GB2012/050213, PCT/GB2012/050214, PCT/GB2012/050223 and PCT/GB2012/051326, the contents of which are herein incorporated by reference, a subset of the communications resource elements comprising a conventional carrier (a "host carrier") are defined as a "virtual carrier", where the host carrier has a certain bandwidth (first frequency range) and where the virtual carrier has a reduced bandwidth (second frequency range) compared to the host carrier's bandwidth. Data for reduced capability devices is separately transmitted on the virtual carrier set of communications resource elements. Accordingly, data transmitted on the virtual carrier can be received and decoded using a reduced complexity or capability transceiver unit.

Devices provided with reduced complexity or capability transceiver units (hereafter referred to as "reduced capability devices") could operate by using a part of its full capability (i.e. reduced capability set of its full capability) or they could be constructed to be less complex and less expensive than conventional LTE type devices (onwards referred to generally as LTE devices). Accordingly, the deployment of such devices for MTC type applications within an LTE type network can become more attractive because the provision of the virtual carrier allows communications devices with less expensive and less complex transceiver units to be used.

Figure 4:
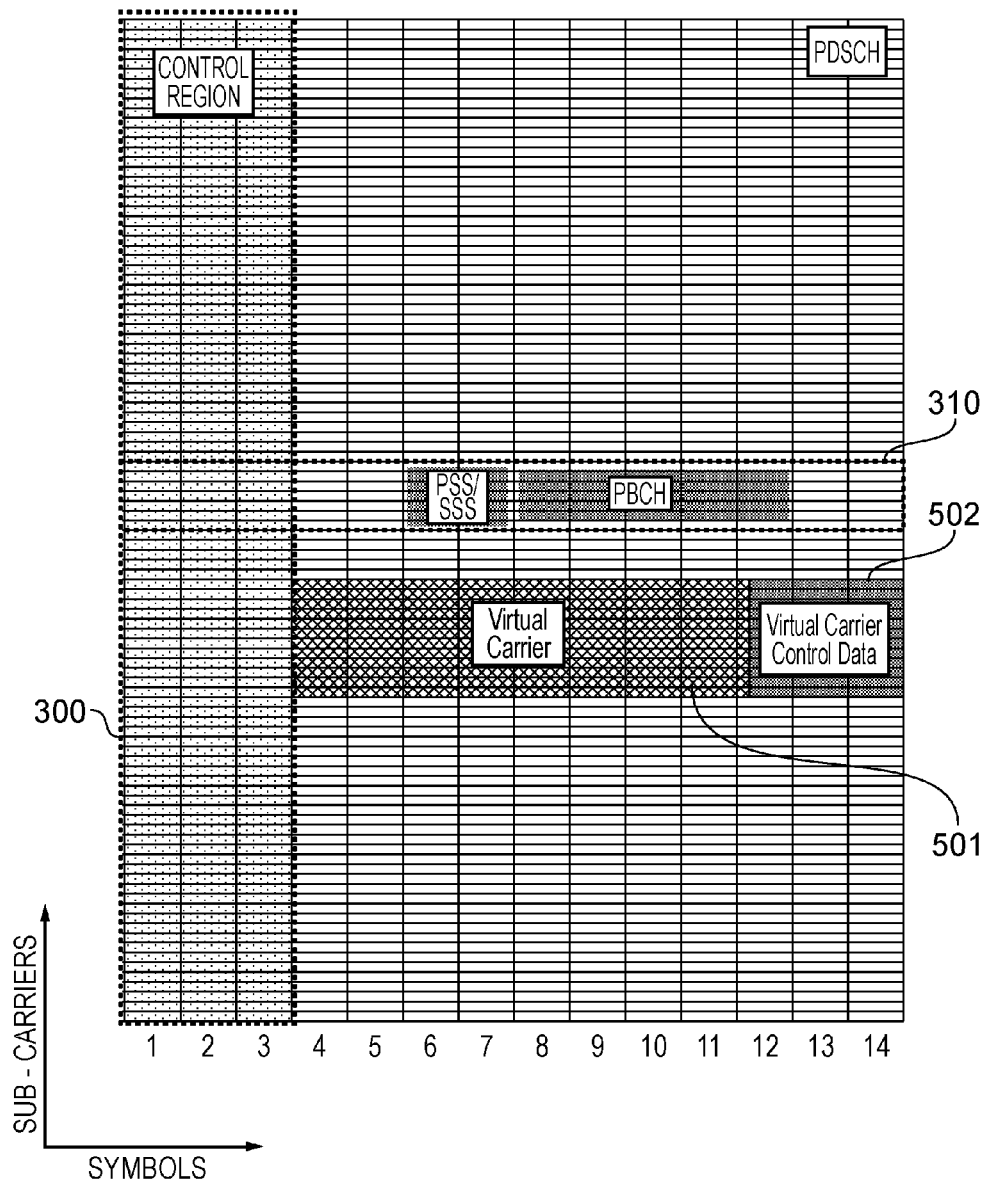
FIG. 4 provides a schematic diagram illustrating an LTE downlink radio sub-frame in which a virtual carrier has been inserted.

FIG. 4 provides a schematic diagram illustrating an LTE downlink sub-frame which includes a virtual carrier inserted in a host carrier.

In keeping with a conventional LTE downlink sub-frame, the first n symbols (n is three in FIG. 4) form the control region 300 which is reserved for the transmission of downlink control data such as data transmitted on the PDCCH. However, as can be seen from FIG. 4, outside of the control region 300 the LTE downlink sub-frame includes a group of communications resource elements below the central band 310 which form a virtual carrier 501. The virtual carrier 501 is adapted so that data transmitted on the virtual carrier 501 can be treated as logically distinct from the data transmitted in the remaining parts of the host carrier and can be decoded without first decoding all the control data from the control region 300. Although FIG. 4 shows the virtual carrier occupying frequency resources below the centre band, in general the virtual carrier can alternatively either occupy frequency resources above the centre band or frequency resources including the centre band. If the virtual carrier is configured to overlap any resources used by the PSS, SSS or PBCH of the host carrier, or any other signal transmitted by the host carrier that a communications device operating on the host carrier would require for correct operation and expect to find in a known pre-determined location, the signals on the virtual carrier can be arranged such that these aspects of the host carrier signal are maintained.

As can be seen from FIG. 4, data transmitted on the virtual carrier 501 is transmitted across a limited bandwidth. This could be any suitable bandwidth providing it is smaller than that of the host carrier. In the example shown in FIG. 4 the virtual carrier is transmitted across a bandwidth comprising 12 blocks of 12 sub-carriers (i.e. 144 sub-carriers) which is equivalent to a 2.16 MHz transmission bandwidth. Accordingly, a device receiving data transmitted on the virtual carrier need only be equipped with a receiver capable of receiving and processing data transmitted over a bandwidth of 2.16 MHz. This enables reduced capability devices (for example MTC type devices) to be provided with simplified receiver units yet still be able to operate within an OFDM type communication network which, as explained above, conventionally requires devices to be equipped with receivers capable of receiving and processing an OFDM signal across the entire bandwidth of the signal.

As explained above, in OFDM based mobile communication systems such as LTE, downlink data is dynamically assigned to be transmitted on different sub-carriers on a sub-frame by sub-frame basis. Accordingly, in every sub-frame the network must signal which sub-carriers on which symbols contain data relevant to which devices (i.e. downlink resource allocation signalling).

As can be seen from FIG. 3, in a conventional downlink LTE sub-frame this information is transmitted on the PDCCH during the first symbol or symbols of the sub-frame. However, as previously explained, the information transmitted in the PDCCH is spread across the entire bandwidth of the sub-frame and therefore cannot be received by a mobile communication device with a simplified receiver unit capable only of receiving the reduced bandwidth virtual carrier.

Accordingly, as can be seen in FIG. 4, some symbols of the virtual carrier can be reserved as a virtual carrier control region 502 which is allocated for the transmission of signalling information, which can be resource allocation messages indicating which communications resource elements of the virtual carrier 501 have been allocated. In some examples the number of symbols comprising the virtual carrier control region 502 can be fixed.

The virtual carrier control region can be located at any suitable position within the virtual carrier for example in the first few symbols of the virtual carrier. In a further example, the virtual carrier control symbols may reference virtual carrier PDSCH transmissions in a separate sub-frame.

Figure 5:
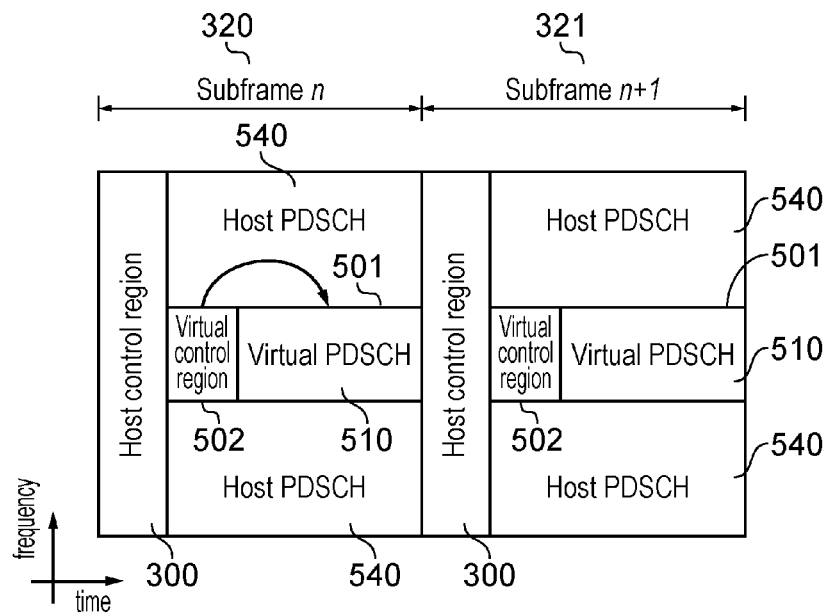
FIG. 5 provides a schematic diagram illustrating an example of two successive LTE downlink radio sub-frames which are arranged to provide a virtual carrier including communications resources within a bandwidth which is narrower than a bandwidth of a host system.

FIG. 5 provides a simplified arrangement to the virtual carrier configuration shown in FIG. 4 for two consecutive sub-frames n, n+1 320, 321. As for the example shown in FIG. 4 resource allocation messages can be communicated via the host control region 300 which corresponds to the PDCCH for allocating resources of the host shared channel which is the PDCCH 540 to full bandwidth capable communications devices. For the simplified example shown in FIG. 5, a virtual carrier 501 is shown approximately in a central region of the frequency band width of the host system. As explained above, a virtual carrier control region 502 is shown for allocating resources which are shared amongst the reduced capability devices. Thus, the virtual carrier control region 502 transmits resource allocation messages to the communications devices 104 allocating communications resources of the virtual carrier PDSCH 540 from within the frequency range corresponding to the virtual carrier 501.

In FIG. 5 the control region 300 is shown in a corresponding position to that in which it appears in FIG. 4 and may be in one example the PDCCH which communicates messages to communications devices allocating communications resources which are shared by communications devices. In order to receive the messages, a communications device 104 needs to have a receiver unit which can receive signals transmitted across the full frequency range of the PDCCH 300.

Narrow Band Control Channel

It has been proposed, for example for LTE systems to provide a narrow band control channel region within a sub-frame together with a wide band control channel region because the wide band control channel region typically exists in the same part of the sub-frame of a wireless access interface and across all sub-carriers in the frequency band of the host carrier. The wide band control channel region may correspond to the PDCCH 300 in the example of LTE. Accordingly, it is possible that two base stations of neighbouring cells are transmitting different control channel information in the wide band control channel region contemporaneously which could, therefore interfere with each other. By providing a narrow band control channel region within each sub-frame which can be in a different location in frequency in the neighbouring cells, covering a different set of sub-carriers, for example, then signalling information can be communicated to communications devices within different cells with a reduced potential for causing co-channel inter-cell interference. Furthermore beam forming techniques can be applied to signals transmitted or received on the narrow band control channel. Such an arrangement for example for LTE is being proposed in 3GPP.

Figure 6:
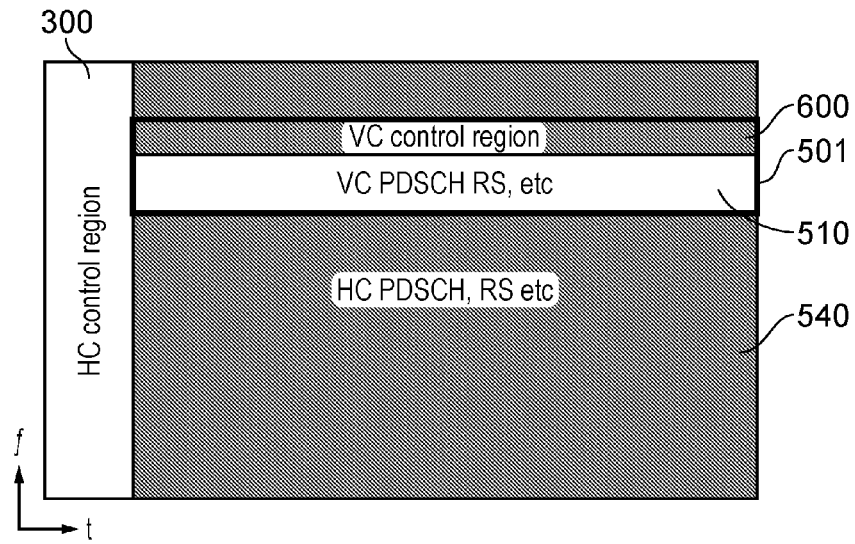
FIG. 6 provides a schematic diagram illustrating an example of an LTE downlink radio sub-frame which includes a narrow band control channel.

As shown in FIG. 6 a narrow band control channel region 600 is also provided, which for the example of LTE could contain the EPDCCH 600. The narrow band control channel 600 communicates among other things resource allocation messages to communications devices. However, the narrow band control channel region 600 is narrower in frequency than the wide band control channel region 300 and extends for substantially the entire sub-frame after the transmission of the wide band control channel 300. As shown in the example of FIG. 6, the narrow band control channel 600 is formed within a virtual carrier region 501. Thus in one example the narrow band control channel 600 could be the EPDCCH and the wide band control channel could be the PDCCH 300 although the skilled person will appreciate that these are just examples of respective wide band and narrow band control channels, which are applicable for the LTE example.

Sleep Indication Signal (SIS)

As explained above, embodiments of the present disclosure can provide an arrangement for communicating a sleep indication signal to one or more communications devices to indicate that these one or more communications devices do not need to detect and recover signalling information communicated in the narrow band control channel, which in one example is the EPDCCH. Such an arrangement is shown in FIGS. 7a and 7b.

FIG. 7a corresponds to the example illustrated in FIG. 6. In FIGS. 7a and 7b, a sleep control channel 700 is provided for communicating a sleep indication signal (SIS) to one or more mobile communications terminals which are identified as not being allocated communications resources within one or more sub-frames. As will be appreciated in order to conserve power communications devices which are not to be allocated shared communications resources can power down at least part of their receivers. To inform these communications devices to power down at least part of their receivers, the SIS should be provided before or as soon as possible after the communications devices attempt to detect signalling information from the narrow band control channel. Accordingly, and as shown in FIG. 7a the sleep control channel 700 is disposed substantially at the start of the narrow band control channel 600 and may provide a 'sleep' indication for that sub-frame.

An example arrangement for the allocation of the sleep control channel 700 is shown in more detail in FIG. 7b. In FIG. 7b, two resource blocks 720, 722 each comprising twelve communications resource elements are shown. The narrow band control channel 600 is shown alongside shared communications resources 540 which are allocated to the virtual carrier and therefore form part of the (second) frequency range allocated to the virtual carrier.

As will be appreciated, whilst the above explanation has been provided in respect of receiving signals on the downlink, the resource allocations transmitted on control channels may be of communications resources for up-link transmissions by the communications devices to the mobile communications network.

As explained above, for an example in which the narrow band control channel region is used for a virtual carrier application with reduced capability devices, a reduced capability receiver, being strictly narrowband, is not able to receive signalling information from the host carrier PDCCH. As such it is not currently possible to implement a micro-sleep functionality in which communication devices not using the narrow band control channel region 600 but using only the wide band control channel region 300 can go into sleep mode during the sub-frame following the wide band control channel region 300, when there is no control information for the communication devices in the wide band control channel region 300. This is because communications devices using the narrow band control channel region 600 must be 'awake' throughout the sub-frame in order to receive the whole the narrow band control region 600. As a result, all reduced capability communications devices must process the whole of every sub-frame even though they may in at least some sub-frames have no uplink or downlink transmissions scheduled by the signalling information. The receive power consumption and signal processing effort in such sub-frames could be wasted for potentially many reduced capability communications devices. For MTC devices, which are expected to operate with low power consumption, limited battery capacity and yet very long life, it is desirable to minimise such wasted power. The SIS could be embedded into a limited resource available for the narrow band control channel region whilst still leaving enough space for the actual DCI messages for multiple communications devices to be transmitted.

Embodiments may therefore be arranged to embed a very small amount of information at the start of an EPDCCH-like virtual carrier control region (narrow band control channel region), to instruct certain communications devices that they may cease processing the remainder of the sub-frame. Since the narrow band control channel region is likely to operate in highly restricted resources, this SIS must be expressed very compactly whilst still preferably allowing multiple communications devices to receive the SIS in a sub-frame.

As shown in the example embodiment of FIG. 7a at the beginning of the narrow band control region 600 an SIS is embedded to convey the identity of at least one communications device for which there is no downlink or uplink resource assignment in the present sub-frame. As such communications devices may try to decode the SIS in which the identity is conveyed and, if they find themselves identified there, may abandon processing the rest of the sub-frame.

In one example structure of the SIS, the virtual carrier will be in the minimum permitted LTE bandwidth of 1.4 MHz, or 6 RBs. The virtual carrier begins after the wide band control region 300, which is variable in width per sub-frame, or the virtual carrier is operating on a carrier with no control region, such as may transpire in future on a New Carrier Type. It is desirable to minimise the control overhead in such restricted resource, so in one example the narrow band control channel region is just 1 RB wide, positioned anywhere contiguously within the virtual carrier. Illustratively, the narrow band control channel region may occupy both slots of the sub-frame, but this is just one example. It is further desirable to minimise the resource occupied by the SIS, so in one example the SIS is arranged to occupy a single OFDM symbol, and therefore twelve resource elements. Keeping the format of PDCCH and EPDCCH, it is assumed that the SIS uses QPSK modulation for robustness. Therefore, there is a maximum of 24 bits available to implement SIS. This arrangement is summarised in FIG. 7 (b) which shows an expanded representation on just the first two resource blocks of the virtual carrier, but as will be appreciated this is one example only.

As will be appreciated a mobile communications device 104 which receives an SIS from the sleep control channel 700 will power down at least part of its receiver therefore avoiding having to recover signalling information from the narrow band control channel 600 which extends over the entire length of the sub-frame. Therefore in a typical arrangement in which the narrow band control channel communicates resource allocation messages to communications devices to allocate resources of the shared channel 540 for a subsequent sub-frame, the sleep indication signal transmitted in the sleep control channel 700 will inform the communications device to power down its receiver because it does not need to receive the entire signals transmitted in the narrow band control channel 600.

As will be appreciated therefore a power saving to the communications terminals is provided, the power saving offered depending on the position in time of the sleep control region, and the width of the region conveying the SIS. In the example given, if the wide band control region is three symbols wide, the communications device can sleep after four out of the fourteen OFDM symbols in a sub-frame.

Figure 7:
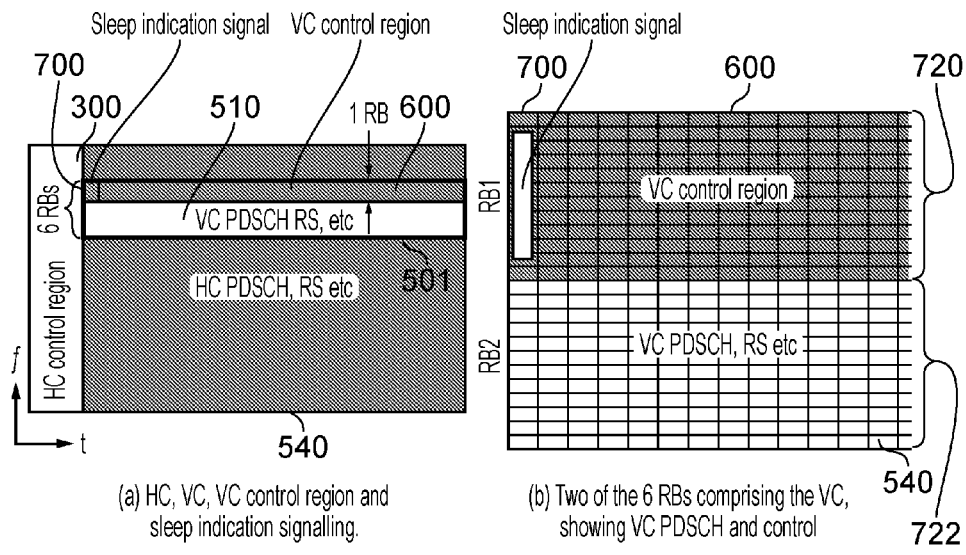
FIG. 7a provides a schematic diagram illustrating an example of an LTE downlink radio sub-frame in which a virtual carrier is provided and includes a narrow band control channel in accordance with an example embodiment.
FIG. 7b presents an illustrative schematic diagram of part of the example of FIG. 7a in an expanded view.
Figure 8:
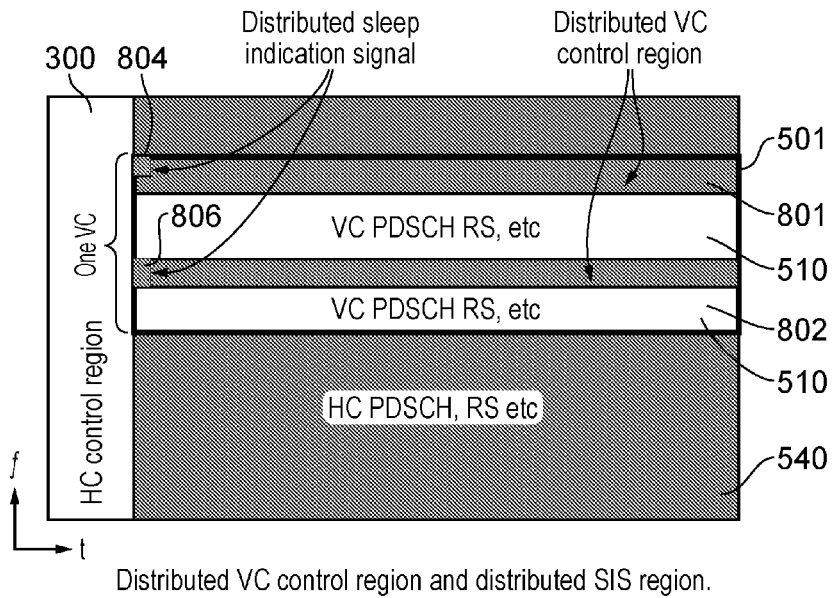
FIG. 8 provides a schematic diagram illustrating an example of an LTE downlink radio sub-frame in which a virtual carrier is provided and includes a narrow band control channel which is distributed between two parts of a virtual carrier in accordance with an example embodiment.

A further example embodiment is shown in FIG. 8 which corresponds to that shown in FIG. 7 except that the second narrow band control channel is formed of first and second parts 801, 802 which are disposed at different frequencies within a frequency range of the host carrier. The first and second parts of the narrow band control channel extend over the sub-frame from the first wide band control channel 300. However, as shown in this example the SIS is transmitted in first and second parts of the sleep control channel regions 804, 806 which allows some frequency diversity to be afforded for improving a likelihood of correctly receiving the SIS at the communications terminals. As with the example shown in FIG. 7 if an SIS is transmitted in the sleep control channel from the first and second parts 804, 806 in which one or more communications devices are identified using an appropriate identifier then the communications devices do not need to receive the signalling information for the remainder of the narrow band control channel 801, 802 and accordingly can power down their receivers.

In general, the total sleep control channel region may be divided unequally between the multiple parts of the distributed narrow band control region depending on such factors as their respective resource availability, and need not extend across the entire frequency width of a given part of the control region. The sleep control channel region may also be interleaved across such a distributed narrow band control region. The manner of such division and interleaving could be defined in specifications or configured semi-statically by RRC.

As will be appreciated the structure shown in FIG. 8 is analogous to a distributed EPDCCH whereas embodiments until now have had a narrow band control region analogous to a localised EPDCCH. Nevertheless, the methods of previous embodiments apply to this embodiment also.

Sleep Indication Signal Format

As explained above, in one example the SIS may include sufficient capacity for communicating identifiers of communications devices conveyed in a 24-bit field, which may be referred to as an SIS identity (SISI). The SISI could be configured at the communications devices via RRC at initial setup. Preferably, SISIs would be shorter than 24 bits so that multiple devices can be sent an SIS in one sub-frame. For example, if an SISI for a communications device is 6 bits long, then the SIS can be divided into four non-overlapping regions, each 6 bits long, that communications devices are expected to search for their SISI. In this way, $2^6=64$ communications devices can be provided with a SISI per virtual carrier, and 4 can be given a sleep indication per sub-frame per virtual carrier. Other combinations of SISI length and division of the 24 bit sleep control channel region would produce other supported communications device quantities (for example, SISI could be 8 bits long, supporting 256 communications devices, with 3 able to receive a sleep indication per virtual carrier per sub-frame).

Variable SISI Length

In another example similar to the first, the length of a SISI is adjusted by the eNB 101 to account for how often the communications device is likely to receive a SIS. This adjustment could be for example on the basis of the down link traffic profile for the communications device 104 over some time history, or by network configuration according to the application. A communications device 104 which is relatively more likely to receive a SIS could receive a shorter SISI so that it can be signalled more often while still leaving space in the sleep control channel region for other communications devices to also receive SIS in the same sub-frame. If the SISI is RRC configurable, then it can be altered as the network detects that a traffic profile of a communications device is changing, or by an indication from the application that there has been a change in the communications device's likely needs.

Sequential Offset C-RNTI as SISI

In further example, instead of introducing a new SISI of previous embodiments, the SISI is the Cell-Radio Network Temporary Indentifier (C-RNTI) instead. This reduces the amount of information that must be transferred over RRC. However, the C-RNTI is always 16 bits long so, in the example of the sleep control channel region being at most 24 bits long, only one communications device could be signalled per sub-frame. Therefore, in an example embodiment, the network chooses C-RNTIs such that their binary bit patterns are nested. A communications device then need only be configured with the offset within the sleep control channel region at which it should begin trying to decode for its C-RNTI. For example, if the following 3 C-RNTIs, expressed in hexadecimal then binary, are used:

communications device0 C-RNTI: 0x66E9=0 1 1 0 0 1 1 0 1 1 1 0 1 0 0 1 communications device1 C-RNTI: 0xCDD3=1 1 0 0 1 1 0 1 1 1 0 1 0 0 1 1 communications device2 C-RNTI: 0x9BA7=1 0 0 1 1 0 1 1 1 0 1 0 0 1 1 1

SIS transmitted=0 1 1 0 0 1 1 0 1 1 1 0 1 0 0 1 1 1

As such, all three communications devices' C-RNTIs can be embedded within 18 bits and clearly six further communications devices could be similarly nested. A communications device need only be configured, e.g. by RRC, such that it should decode in the sleep control channel region starting from position 0, 1, or 2 (counting from the left-most bit) in the example. The particular method of choosing C-RNTIs to be nested to allow their multiplexing within a particular resource provides an advantage in that by nesting the C-RNTI's for communications devices an RRC configuration need convey only the bit-wise offset in the sleep control channel region from where the communications device should begin decoding for its own C-RNTI.

CDM of SISI

In a further example, more than one SISI may be transmitted in the sleep control channel region 700. The multiple SISIs are each scrambled with a different code such that interference between the multiple transmissions is below a suitable threshold after decoding at the communications device. For example, the orthogonal cover codes (OCC) or Walsh-Hadamard sequences used elsewhere in LTE could be used for this purpose also. In one implementation, the same un-scrambled SISI could then be configured for multiple communications devices, and communications devices are then distinguished in the code domain, provided sufficient code orthogonality. A communications device would need to be configured with which scrambling code it should use to de-scramble the sleep control channel region, and also which un-scrambled SISI it can react to. The latter could be provided by one of the other embodiments explained above, notably the offset of the C-RNTI example, which could significantly increase the capacity of the sleep control channel region. The list of scrambling codes could be provided in specifications and signalled via RRC.

Group-sleep Indication Signal

A further example corresponds to the example embodiments presented above, but a single SISI can apply to more than one communications device at a time. For example this could be by RRC signalling of the SISI as in the first example above (where the SISI is independent of other identities held by the communications device). In this case, a group of communications devices all with the same identity can be allowed to sleep in a sub-frame, thus further increasing the capacity of the sleep control channel region 700.

Sleep Control Channel Region

In general, the sleep control channel region 700 could convey additional data as well as the SISI(s) for that sub-frame. This could require more resources to be reserved. For example, it may be appropriate for the region to extend across the bandwidth of the virtual carrier and carry SISI(s) as well as format indications regarding the narrow band control region, for a similar purpose as PCFICH in Rel-8.

As explained above in one example the second narrow band communications channel is an EPDCCH 600 and the first wide band control channel is a PDCCH 300. As will be appreciated conventional communications devices which have a capability for receiving signals from the frequency range of the host carrier may also be configured to receive signalling information from the narrow band control channel 600 because the narrow band control channel affords some advantages in respect of a reduction of co-channel interference and a beam forming capability. Accordingly in one example it may be desired that the sleep control channel region 700 for transmitting the SIS does not form part of the narrow band control channel 600. Such an arrangement is shown in FIG. 9.

Figure 10:
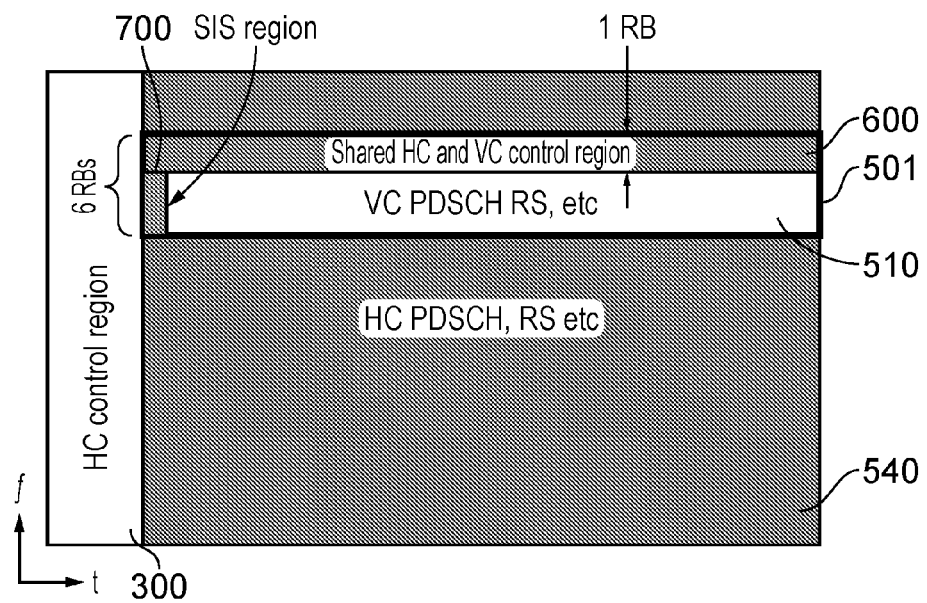
FIG. 10 provides a schematic diagram illustrating an example of an LTE downlink radio sub-frame in which a virtual carrier is provided and includes a narrow band control channel in accordance with an example embodiment.

In FIG. 10 the sleep control channel 900 which is transmitted as part of the shared resources of the virtual carrier 540 is transmitted in a way that it does not use any part of the narrow band control channel 600. Accordingly, the narrow band control channel 600 can be used to communicate signalling information such as resource allocation messages to both full capability communications devices and second reduced capability communications devices which only operate within the frequency range of the virtual carrier 501.

Some example embodiments can provide an arrangement in which reduced capability communications devices of a second type exist within a cell served by a base station with full capability devices of a first type and in which both a wide band control channel region 300 and a narrow band control channel region 600 is provided by a wireless access interface to the first and second types of communications devices. The base station can arrange for the wireless access interface to locate the narrow band control region 600 within a second frequency range providing a virtual carrier which exists within a host carrier covering a first frequency range, the first frequency range including the second frequency range. Thus, a scheduler for example of the base station is adapted to locate the narrow band control channel 600 (EPDCCH) as part of a virtual carrier within the second frequency range so that communications devices of the second type are able to receive control information granting access to communications resources from the narrow band control channel 600 as well as devices of the first type also being granted access to communications resources from the narrow band control channel 600. However, as a result of the reduced capability of the communications devices of the second type, the narrow band control channel grants access to communications resources only within the second frequency range whereas full capability devices of the first type may be granted access to shared resources within the first frequency range of the host carrier. Accordingly, the co-existence of full capability communications devices of the first type with reduced capability communications devices of the second type which receive control information granting access to communications resources from the same narrow band control channel provides an arrangement which efficiently uses communications resources available to the communications systems.

Figure 9:
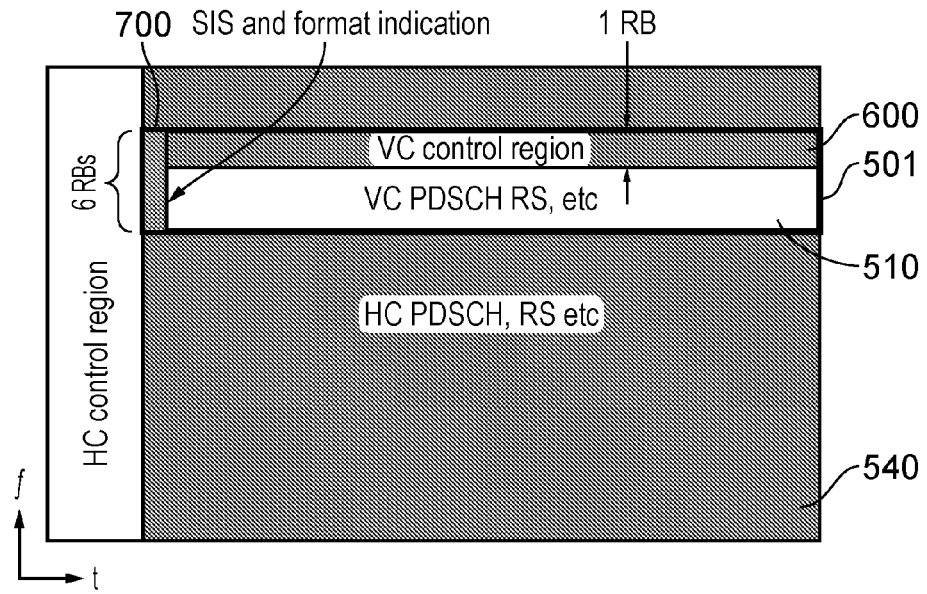
FIG. 9 provides a schematic diagram illustrating an example of an LTE downlink radio sub-frame in which a virtual carrier is provided and includes a narrow band control channel in accordance with an example embodiment.

An arrangement shown in FIG. 9 provides an example in which a sleep control channel region 700, for communicating SIS(s), is formed in a region of the virtual carrier, which would otherwise form part of both the second narrow band control channel 600 and the shared resources 540 of the virtual carrier 501. As will be appreciated for the example shown in FIG. 9, full capability communications devices will need to be adapted to receive the SIS or to only begin to receive signalling information from the second narrow band control channel 600 starting after the sleep control channel region 700 containing the SIS.

According to an example shown in FIG. 10, the narrow band control channel 600 is shared by communications devices able to use the full extent of the host carrier as well as reduced capability narrowband communications devices confined to the virtual carrier 501. This control region could be an EPDCCH as being defined by 3GPP for Rel-11. Therefore, in this embodiment, the sleep control channel region 700 is inserted at the start of the virtual carrier shared resources 540 but only on subcarriers not used by EPDCCH so that non-virtual carrier communications devices are not disturbed by its presence. As with the example illustrated in FIG. 9 the sleep control channel region 700 could contain additional data beyond the SISI(s) if its resource is large enough to do so. For example, it could provide information to virtual carrier communications devices regarding the location of the (shared) control region, for virtual carrier communications devices which are not included in the sleep indication in a given sub-frame.

Example Architecture

Figure 11:
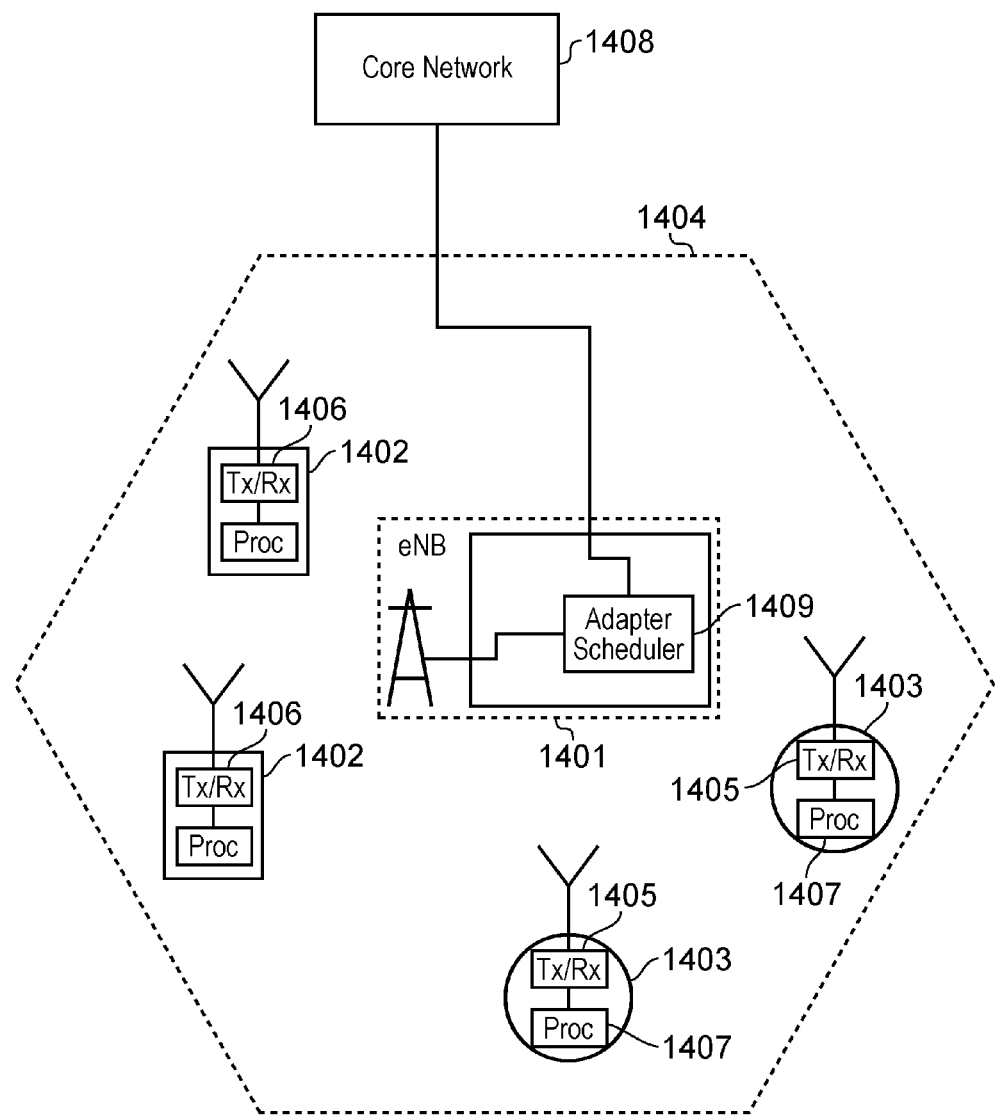
FIG. 11 provides a schematic diagram showing part of an adapted LTE mobile telecommunication network arranged in accordance with an example of the present disclosure.

FIG. 11 provides a schematic diagram showing part of an adapted LTE mobile communications system. The system includes an adapted enhanced Node B (eNB) 1401 connected to a core network 1408 which communicates data to a plurality of conventional LTE devices 1402 and reduced capability devices 1403 within a coverage area (i.e. cell) 1404. Each of the reduced capability devices 1403 has a transceiver unit 1405 which includes a receiver unit capable of receiving data across a reduced bandwidth and a transmitter unit capable of transmitting data across a reduced bandwidth (or full bandwidth of an uplink carrier supported by the eNB 1401) when compared with the capabilities of the transceiver units 1406 included in the conventional LTE devices 1402.

The adapted eNB 1401 is arranged to transmit downlink data using a sub-frame structure that includes a virtual carrier as described above for example with reference to FIGS. 4 to 10. The reduced capability devices 1403 are thus able to receive and transmit data using the uplink and downlink virtual carriers as described above.

As has been explained above, because the reduced complexity devices 1403 receive data across a reduced bandwidth downlink virtual carriers, the complexity, power consumption and cost of the transceiver unit 1405 needed to receive and decode downlink data and to encode and transmit uplink data is reduced compared to the transceiver unit 1406 provided in the conventional LTE devices.

When receiving downlink data from the core network 1408 to be transmitted to one of the devices within the cell 1404, the adapted eNB 1401 is arranged to determine if the data is bound for a conventional LTE device 1402 or a reduced capability device 1403. This can be achieved using any suitable technique. For example, data bound for a reduced capability device 1403 may include a virtual carrier flag indicating that the data must be transmitted on the downlink virtual carrier. If the adapted eNB 1401 detects that downlink data is to be transmitted to a reduced capability device 1403, an adapted scheduling unit 1409 included in the adapted eNB 1401 ensures that the downlink data is transmitted to the reduced capability device in question on the downlink virtual carrier. In another example the network is arranged so that the virtual carrier is logically independent of the eNB. More particularly the virtual carrier is arranged to appear to the core network as a distinct cell. From the perspective of the core network it is not known that the virtual carrier is physically co-located with, or has any interaction with, the host carrier of the cell. Packets are routed to/from the virtual carrier just as they would be for any normal cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific communications device. The eNB is provided with information indicating which logical connection is associated with which communications device. Information is also provided at the eNB indicating which communications devices are reduced capability devices and which are conventional LTE devices. This information could be derived from the fact that a reduced capability device would initially have connected using virtual carrier resources. In other examples reduced capability devices are arranged to indicate their capability to the eNB during the connection procedure. Accordingly the eNB can map data from the core network to a specific communications device based on whether the communications device is a reduced capability device or an LTE device.

When scheduling resources for the transmission of uplink data, the adapted eNB 1401 is arranged to determine if the device to be scheduled resources is a reduced capability device 1403 or a conventional LTE device 1402. In some examples this is achieved by analysing the random access request transmitted on the PRACH using the techniques to distinguish between a virtual carrier random access request and a conventional random access request as described above. In any case, when it has been determined at the adapted eNB 1401 that a random access request has been made by a reduced capability device 1402, the adapted scheduler 1409 is arranged to ensure that any grants of uplink communications resource elements are within the virtual uplink carrier.

The embodiments described above are arranged to allow microsleep-like behaviour of communications devices in a virtual carrier system. This can permit power savings to be obtained at a connected-mode communications device by abandoning the processing of a sub-frame in which there will be no down link or up link resource assignment relevant to that communications device. It allows the network to signal this information to multiple communications devices in one sub-frame with minimal DL control region resource loss. The embodiments have been described with reference to LTE, but may also be applicable in other wireless communication systems, such as UMTS, as well as in both FDD and TDD systems.

SUMMARY

Figure 12:
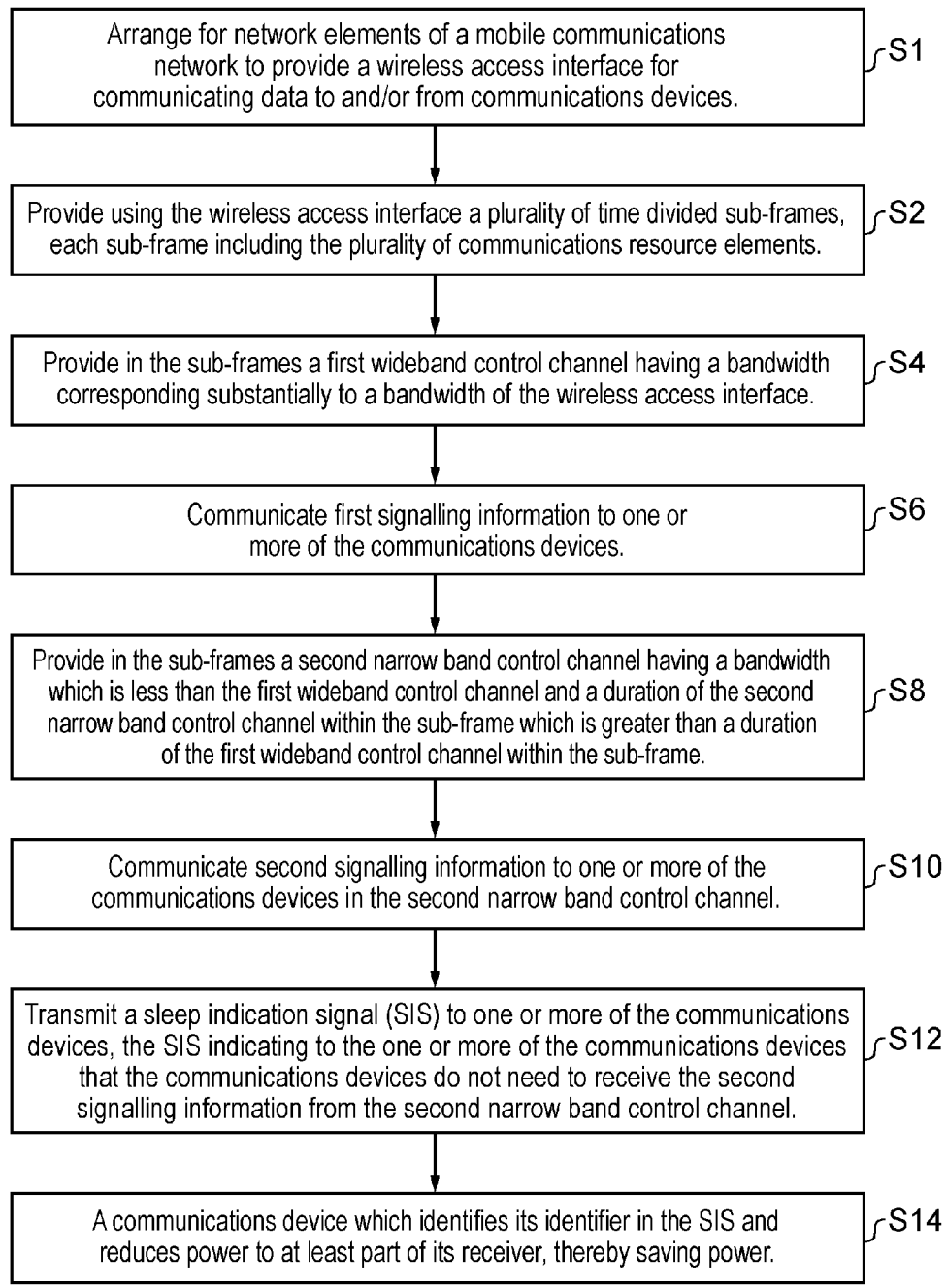
FIG. 12 is an illustrative flow diagram according to an example embodiment.

A flow diagram providing an illustration of a mobile communications network and a communications terminal operating in accordance with an example embodiment is shown in FIG. 12, which is summarised as follows:

S1: One or more network elements, such as base stations or eNBs, of a mobile communications network are configured to provide a wireless access interface for communicating data to and/or from communications devices.

S2: The wireless access interface provided by the network elements is arranged to include a plurality of time divided sub-frames, each sub-frame including the plurality of communications resource elements.

S4: The wireless access interface provided by the network elements is arranged to include in the sub-frames a first wideband control channel having a bandwidth corresponding substantially to a bandwidth of the wireless access interface S6: Communicate first signalling information to one or more of the communications devices.

S8: The wireless access interface provided by the network elements is arranged to include, in the sub-frames, a second narrow band control channel. The second narrow band control channel is configured to have a bandwidth which is less than the first wideband control channel and a duration within the sub-frame which is greater than a duration of the first wideband control channel within the sub-frame.

S10: Communicate second signalling information to one or more of the communications devices in the second narrow band control channel, the second signalling information, being for example resource allocation messages for allocating resources to the communications devices.

S12: Transmit a sleep indication signal (SIS) to one or more of the communications devices, the SIS indicating to the one or more of the communications devices that the communications devices do not need to receive the second signalling information from the second narrow band control channel, or in other words that there is no signalling information for the one or more communications devices in the second narrow band communications channel. Alternatively the SIS could include an indication of one or more of the communications devices which are to receive signalling information in the second narrow band control channel.

S14: A communications device identifies its identifier in the SIS and reduces power to at least part of its receiver, thereby saving power, if the SIS represents and indication that there is no signalling information in the second narrow band communications channel for the communications device.

According to one example there is provided a method of transmitting data to and/or receiving data from communications devices using a mobile communications network. The method comprising:

providing a wireless access interface, using one or more network elements for communicating data to and/or from the communications devices, the wireless access interface providing a plurality of communications resource elements across a first frequency range and providing a plurality of communications resource elements within a second frequency range which is within and smaller than the first frequency range, wherein the wireless access interface includes a plurality of time divided sub-frames, each sub-frame including the plurality of communications resource elements of the first frequency range and the plurality of the communications resource elements of the second frequency range, and at least one of the each sub-frames includes a first wideband control channel in a part of the sub-frame having a bandwidth corresponding substantially to the first frequency range for communicating first signalling information to one or more of the communications devices, and at least one of the sub-frames includes a second narrow band control channel in a second part of the sub-frame and having a bandwidth which is less than the first wideband control channel and a duration of the second narrow band control channel within the sub-frame is greater than a duration of the first wideband control channel within the sub-frame, the second narrow band control channel being configured for communicating second signalling information to one or more of the communications devices, and transmitting a sleep indication signal to one or more of the communications devices, the sleep indication signal indicating to the one or more of the communications devices that the communications devices do not need to receive the second signalling information from the second narrow band control channel.

As may be appreciated from the above explanation there is an evident limit on how many communications devices can receive an SIS in a sub-frame. Other communications devices with no resource allocation will have to decode the entire sub-frame as per normal operation in such a virtual carrier.

Various modifications can be made to examples of the present disclosure. Embodiments of the present disclosure have been defined largely in terms of reduced capability devices transmitting data via a virtual carrier inserted in a conventional LTE based host carrier. However, it will be understood that any suitable device can transmit and receive data using the described virtual carriers for example devices which have the same capability as a conventional LTE type device or devices which have enhanced capabilities.

Furthermore, it will be understood that the general principle of inserting a virtual carrier on a subset of uplink or downlink resources can be applied to any suitable mobile telecommunication technology and need not be restricted to systems employing an LTE based radio interface.

Various further aspects and features of the present disclosure are defined in the following numbered clauses:

1. A mobile communications system for transmitting data to and/or receiving data from communications devices, the mobile communications system comprising:

one or more base stations, each of which includes a transmitter and a receiver configured to provide a wireless access interface for communicating data to and/or from the communications devices, the wireless access interface providing a plurality of communications resource elements across a first frequency range, wherein the wireless access interface provided by the one or more base stations includes a plurality of time divided sub-frames, and at least one of the sub-frames includes a first wideband control channel in a part of the sub-frame for communicating first signalling information to one or more of the communications devices, and at least one of the sub-frames includes a second narrow band control channel in a second part of the sub-frame and having a bandwidth which is less than the first wideband control channel and a duration of the second narrow band control channel within the sub-frame is greater than a duration of the first wideband control channel within the sub-frame, the second narrow band control channel being configured for communicating second signalling information to one or more of the communications devices, and the one or more base stations are configured to transmit a sleep indication signal to one or more of the communications devices, the sleep indication signal indicating to the one or more of the communications devices that the communications devices do not need to receive the second signalling information from the second narrow band control channel.

2. A mobile communications system according to clause 1, wherein the sleep indication signal indicates to the one or more communications devices not to receive the signalling information for one or more of the sub-frames.

3. A mobile communications system according to clause 1 or 2, wherein the sleep indication signal is transmitted by the one or base stations at a time within the sub-frame which is closer to a start of the sub-frame than an end of the sub-frame.

4. A mobile communications system according to clause 3, wherein the sleep indication signal is transmitted by the one or base stations at a time within the sub-frame which is close to a start of the second narrow band control channel.

5. A mobile communications system according to any preceding clause, wherein the sleep indicator signal includes an identifier for a plurality of the communications devices, the sleep indicator indicating to the plurality of the communications devices that the communications devices identified by the identifier do not need to receive the second signalling information.

6. A mobile communications system according to clause 5, wherein the communications devices are divided into groups, and the identifier of the sleep indicator signal provides an indication of one of the groups of communications devices which do not need to receive the second signalling information from the second narrow band control channel.

7. A mobile communications system according to clause 5, wherein the identifier of the sleep indicator field is configured to provide one or more radio network identifier numbers allocated to corresponding communications devices by the network.

8. A mobile communications system according to any preceding clause, wherein the one or more base stations are configured to combine the sleep indicator for one of the communications devices with a different one of a plurality of orthogonal codes, each of the different orthogonal codes being associated with one of the communications devices.

9. A mobile communications system according to any preceding clause, wherein the sleep indicator signal is transmitted to the one or more communications devices in a third control channel, at least part of the third control channel being formed from a part of the second narrow band control channel.

10. A mobile communications system according to clause 9, wherein the wireless access network provides a plurality of communications resource elements within a second frequency range which is within and smaller than the first frequency range, and the third control channel is formed from some of the plurality of communications resource elements within the second frequency range.

11. A mobile communications system according to clause 9, wherein the second narrow band control channel is formed within the plurality of communications resource elements of the second frequency range, and the third control channel is formed within the plurality of communications resource elements of the second frequency range.

12. A mobile communications system according to clause 11, wherein the second narrow band control channel and the third control channel do not share any of the plurality of communications resource elements within the second frequency range.

13. A mobile communications system according to any of clauses 9 to 12, wherein the communications devices include first full capability communications devices configured to receive signals transmitted via a plurality of the communications resource elements within the first frequency range, and second reduced capability communications devices configured to receive signals transmitted via a plurality of the communications resource elements within the second frequency range.

14. A mobile communications system according to clause 13, wherein the first signalling information and the second signalling information provide respective allocation information messages to the full capability communications devices and the second reduced capability communications devices for allocating the plurality of communication resources of the first frequency range and the second frequency range respectively.

15. A network element for a mobile communications network for transmitting data to and/or receiving data from communications devices, the network element comprising:

a transmitter and a receiver configured to provide a wireless access interface for communicating data to and/or from the communications devices, the wireless access interface providing a plurality of communications resource elements across a first frequency range, wherein the wireless access interface includes a plurality of time divided sub-frames, and at least one of the sub-frames includes a first wideband control channel in a part of the sub-frame for communicating first signalling information to one or more of the communications devices, and at least one of the sub-frames includes a second narrow band control channel in a second part of the sub-frame and having a bandwidth which is less than the first wideband control channel and a duration of the second narrow band control channel within the sub-frame is greater than a duration of the first wideband control channel within the sub-frame, the second narrow band control channel being configured for communicating second signalling information to one or more of the communications devices, and the network element is configured to transmit a sleep indication signal to one or more of the communications devices, the sleep indication signal indicating to the one or more of the communications devices that the communications devices do not need to receive the second signalling information from the second narrow band control channel.

16. A network element according to clause 15, wherein the sleep indication signal indicates to the one or more communications devices not to receive the signalling information for one or more of the sub-frames.

17. A network element according to clause 15 or 16, wherein the sleep indication signal is transmitted by the network element at a time within the sub-frame which is closer to a start of the sub-frame than an end of the sub-frame.

18. A network element according to clause 17, wherein the sleep indication signal is transmitted by the network element at a time within the sub-frame which is close to a start of the second narrow band control channel.

19. A network element according to any of clauses 15 to 18, wherein the sleep indicator signal includes an identifier for a plurality of the communications devices, the sleep indicator indicating to the plurality of the communications devices that the communications devices identified by the identifier do not need to receive the second signalling information.

20. A network element according to clause 19, wherein the communications devices are divided into groups, and the identifier of the sleep indicator signal provides an indication of one of the groups of communications devices which do not need to receive the second signalling information from the second narrow band control channel.

21. A network element according to clause 19, wherein the identifier of the sleep indicator field is configured to provide one or more radio network identifier numbers allocated to corresponding communications devices by the network.

22. A network element according to any of clauses 15 to 21, wherein the one or more base stations are configured to combine the sleep indicator for one of the communications devices with a different one of a plurality of orthogonal codes, each of the different orthogonal codes being associated with one of the communications devices.

23. A network element according to any of clauses 15 to 22, wherein the sleep indicator signal is transmitted to the one or more communications devices in a third control channel, at least part of the third control channel being formed from a part of the second narrow band control channel.

24. A network element according to clause 23, wherein the wireless access network provides a plurality of communications resource elements within a second frequency range which is within and smaller than the first frequency range, and the third control channel is formed from the plurality of communications resource elements within the second frequency range.

25. A network element according to clause 23, wherein the second narrow band control channel is formed within the plurality of communications resource elements of the second frequency range, and the third control channel is formed within the plurality of communications resource elements of the second frequency range.

26. A network element according to clause 25, wherein the second narrow band control channel and the third control channel do not share any of the plurality of communications resource elements within the second frequency range.

27. A network element according to any of clauses 24 to 26, wherein the communications devices include first full capability communications devices configured to receive signals transmitted via the plurality of communications resource elements within the first frequency range, and second reduced capability communications devices configured to receive signals transmitted via the plurality of communications resource elements within the second frequency range, and the first signalling information and the second signalling information provide respective allocation information messages to the full capability communications devices and the second reduced capability communications devices for allocating the plurality of communication resources of the first frequency range and the second frequency range respectively.

28. A method of transmitting data to and/or receiving data from communications devices using a mobile communications network for, the method comprising:

providing a wireless access interface, using one or more network elements for communicating data to and/or from the communications devices, the wireless access interface providing a plurality of communications resource elements across a first frequency range, wherein the wireless access interface includes a plurality of time divided sub-frames, and at least one of the sub-frames includes a first wideband control channel in a part of the sub-frame for communicating first signalling information to one or more of the communications devices, and at least one of the sub-frames includes a second narrow band control channel in a second part of the sub-frame and having a bandwidth which is less than the first wideband control channel and a duration of the second narrow band control channel within the sub-frame is greater than a duration of the first wideband control channel within the sub-frame, the second narrow band control channel being configured for communicating second signalling information to one or more of the communications devices, and transmitting a sleep indication signal to one or more of the communications devices, the sleep indication signal indicating to the one or more of the communications devices that the communications devices do not need to receive the second signalling information from the second narrow band control channel.

29. A method according to clause 28, wherein the sleep indication signal indicates to the one or more communications devices not to receive the signalling information for one or more of the sub-frames.

30. A method according to clause 28 or 29, wherein the transmitting the sleep indication signal to one or more of the communications devices includes transmitting the sleep indication signal at a time within the sub-frame which is closer to a start of the sub-frame than an end of the sub-frame.

31. A method according to clause 30, wherein the transmitting the sleep indication signal to one or more of the communications devices includes transmitting the sleep indication signal at a time within the sub-frame which is close to a start of the second narrow band control channel.

32. A method according to any of clauses 28 to 31, wherein the sleep indicator signal includes an identifier for a plurality of the communications devices, the sleep indicator indicating to the plurality of the communications devices that the communications devices identified by the identifier do not need to receive the second signalling information.

33. A method according to clause 32, comprising
dividing the communications devices into groups,
providing with the identifier of the sleep indication signal an indication of one of the groups of communications devices which do not need to receive the second signalling information from the second narrow band control channel, and
identifying from the identifier of the sleep indication signal the one or more communications devices which do not need to receive the second signalling information from the second narrow band control channel based on the identified group.

34. A method according to clause 32, comprising
providing with the identifier of the sleep indicator one or more radio network identifier numbers allocated to corresponding communications devices by the network.

35. A method according to any of clauses 28 to 34, comprising
combining the sleep indicator for one of the communications devices with a different one of a plurality of orthogonal codes, each of the different orthogonal codes being associated with one of the communications devices.

36. A method according to any of clauses 28 to 35, comprising
transmitting, from the network element, the sleep indicator signal to the one or more communications devices in a third control channel, at least part of the third control channel being formed from a part of the second narrow band control channel.

37. A method according to clause 36, wherein the wireless access network provides a plurality of communications resource elements within a second frequency range which is within and smaller than the first frequency range, and the third control channel is formed from the plurality of communications resource elements within the second frequency range.

38. A method according to clause 36, comprising
forming, using the network element, the second narrow band control channel within the plurality of communications resource elements of the second frequency range, and
forming, using the network element, the third control channel within the plurality of communications resource elements of the second frequency range.

39. A method according to clause 38, wherein the forming, using the network element, the second narrow band control channel and the forming, using the network element, the second narrow band control channel including forming the third control channel so that the third control channel does do not share any of the plurality of communications resource elements within the second frequency range.

40. A method according to any of clauses 37 to 39, wherein the communications devices include first full capability communications devices configured to receive signals transmitted via the plurality of communications resource elements within the first frequency range, and second reduced capability communications devices configured to receive signals transmitted via the plurality of communications resource elements within the second frequency range, and the method includes providing, with the first signalling information and the second signalling information respective allocation information messages to the full capability communications devices and the second reduced capability communications devices for allocating the plurality of communication resources of the first frequency range and the second frequency range respectively.

The invention claimed is:

1. A mobile communications system for bidirectional data communication between communications devices, the mobile communications system comprising:
one or more base stations, each of which includes a transmitter and a receiver configured to provide a wireless access interface for the bidirectional data communication between the communications devices, the wireless access interface providing a plurality of communications resource elements across a first frequency range, wherein the wireless access interface provided by the one or more base stations includes:
a plurality of time divided sub-frames, and at least one of the sub-frames includes:
a first wideband control channel in a part of the sub-frame for communicating first signaling information to one or more of the communications devices, and at least one of the sub-frames includes:
a second narrow band control channel in a second part of the sub-frame and having a bandwidth which is less than the first wideband control channel and a duration of the second narrow band control channel within the sub-frame is greater than a duration of the first wideband control channel within the sub-frame, the second narrow band control channel being configured for communicating second signaling information to one or more of the communications devices, and
the one or more base stations are configured to transmit a sleep indication signal in a sleep control channel within the second narrow band control channel to one or more of the communications devices, the sleep indication signal indicating to the one or more of the communications devices that the communications devices do not need to receive the second signaling information from the second narrow band control channel.

2. The mobile communications system as claimed in claim 1, wherein the sleep indication signal indicates to the one or more communications devices not to receive the signaling information for one or more of the sub-frames.

3. The mobile communications system as claimed in claim 1, wherein the sleep indication signal is transmitted by the one or more base stations at a time within the sub-frame which is closer to a start of the sub-frame than an end of the sub-frame.

4. The mobile communications system as claimed in claim 3, wherein the sleep control channel is is at a start of the second narrow band control channel.

5. The mobile communications system as claimed in claim 1, wherein the sleep indication signal includes an identifier for a plurality of the communications devices, the sleep indication signal indicating to the plurality of the communications devices that the communications devices identified by the identifier do not need to receive the second signaling information.

6. The mobile communications system as claimed in claim 5, wherein the communications devices are divided into groups, and the identifier of the sleep indication signal provides an indication of one of the groups of communications devices which do not need to receive the second signaling information from the second narrow band control channel.

7. The mobile communications system as claimed in claim 5, wherein the identifier of the sleep indication signal is configured to provide one or more radio network identifier numbers allocated to corresponding communications devices by the network.

8. The mobile communications system as claimed in claim 1, wherein the one or more base stations are configured to combine the sleep indication signal for one of the communications devices with a different one of a plurality of orthogonal codes, each of the different orthogonal codes being associated with one of the communications devices.

9. The mobile communications system as claimed in Claim 1, wherein the wireless access network provides a plurality of communications resource elements within a second frequency range which is within and smaller than the first frequency range, and the sleep control channel is formed from some of the plurality of communications resource elements within the second frequency range.

10. The mobile communications system as claimed in Claim 9, wherein the second narrow band control channel is formed within the plurality of communications resource elements of the second frequency range, and the sleep control channel is formed within the plurality of communications resource elements of the second frequency range.

11. The mobile communications system as claimed in Claim 1, wherein the communications devices include:
first full capability communications devices configured to receive signals transmitted via a plurality of the communications resource elements within the first frequency range, and
second reduced capability communications devices configured to receive signals transmitted via a plurality of the communications resource elements within the second frequency range.

12. The mobile communications system as claimed in claim 11, wherein the first signaling information and the second signaling information provide respective allocation information messages to the full capability communications devices and the second reduced capability communications devices for allocating the plurality of communication resources of the first frequency range and the second frequency range respectively.

13. A network element for a mobile communications network for bidirectional data communication between communications devices, the network element comprising:
 a transmitter and a receiver configured to provide a wireless access interface for the bidirectional data communication between the communications devices, the wireless access interface providing a plurality of communications resource elements across a first frequency range, wherein the wireless access interface includes:
 a plurality of time divided sub-frames, and at least one of the sub-frames includes:
 a first wideband control channel in a part of the sub-frame for communicating first signaling information to one or more of the communications devices, and at least one of the sub-frames includes:
 a second narrow band control channel in a second part of the sub-frame and having a bandwidth which is less than the first wideband control channel and a duration of the second narrow band control channel within the sub-frame is greater than a duration of the first wideband control channel within the sub-frame, the second narrow band control channel being configured for communicating second signaling information to one or more of the communications devices, and
 the network element is configured to transmit a sleep indication signal in a sleep control channel within the second narrow band control channel to one or more of the communications devices, the sleep indication signal indicating to the one or more of the communications devices that the communications devices do not need to receive the second signaling information from the second narrow band control channel.

14. A method of bidirectional data communication between communications devices using a mobile communications network, the method comprising:
 providing a wireless access interface, using one or more network elements for the bidirectional data communication between the communications devices, the wireless access interface providing a plurality of communications resource elements across a first frequency range, wherein the wireless access interface includes:
 a plurality of time divided sub-frames, and at least one of the sub-frames includes:
 a first wideband control channel in a part of the sub-frame for communicating first signaling information to one or more of the communications devices, and at least one of the sub-frames includes:
 a second narrow band control channel in a second part of the sub-frame and having a bandwidth which is less than the first wideband control channel and a duration of the second narrow band control channel within the sub-frame is greater than a duration of the first wideband control channel within the sub-frame, the second narrow band control channel being configured for communicating second signaling information to one or more of the communications devices, and
 transmitting a sleep indication signal in a sleep control channel within the second narrow band control channel to one or more of the communications devices, the sleep indication signal indicating to the one or more of the communications devices that the communications devices do not need to receive the second signaling information from the second narrow band control channel.

15. The method as claimed in claim 14, wherein the sleep indication signal indicates to the one or more communications devices not to receive the signaling information for one or more of the sub-frames.

16. The method as claimed in claim 14, wherein the transmitting the sleep indication signal to one or more of the communications devices includes transmitting the sleep indication signal at a time within the sub-frame which is closer to a start of the sub-frame than an end of the sub-frame.

17. The method as claimed in claim 16, wherein the transmitting the sleep control channel is at a start of the second narrow band control channel.

18. The method as claimed in claim 14, wherein the sleep indication signal includes an identifier for a plurality of the communications devices, the sleep indication signal indicating to the plurality of the communications devices that the communications devices identified by the identifier do not need to receive the second signaling information.

19. The method as claimed in claim 18, comprising:
 dividing the communications devices into groups,
 providing with the identifier of the sleep indication signal an indication of one of the groups of communications devices which do not need to receive the second signaling information from the second narrow band control channel, and
 identifying from the identifier of the sleep indication signal the one or more communications devices which do not need to receive the second signaling information from the second narrow band control channel based on the identified group.

20. The method as claimed in claim 18, comprising:
 providing with the identifier of the sleep indication signal one or more radio network identifier numbers allocated to corresponding communications devices by the network.

21. The method as claimed in claim 14, comprising:
 combining the sleep indication signal for one of the communications devices with a different one of a plurality of orthogonal codes, each of the different orthogonal codes being associated with one of the communications devices.

22. The method as claimed in Claim 14, wherein the wireless access network provides a plurality of communications resource elements within a second frequency range which is within and smaller than the first frequency range, and the sleep control channel is formed from the plurality of communications resource elements within the second frequency range.

23. The method as claimed in Claim 22, comprising:
 forming, using the network element, the second narrow band control channel within the plurality of communications resource elements of the second frequency range, and
 forming, using the network element, the sleep control channel within the plurality of communications resource elements of the second frequency range.

24. The method as claimed in Claim 14, wherein the communications devices include first full capability communications devices configured to receive signals transmitted via the plurality of communications resource elements within the first frequency range, and second reduced capability communications devices configured to receive signals transmitted via the plurality of communications resource elements within the second frequency range, and the method includes providing, with the first signaling information and the second signaling information respective allocation information messages to the full capability communications devices and the second reduced capability communications devices for allocating the plurality of communication resources of the first frequency range and the second frequency range respectively.

* * * * *